United States Patent [19]
Freeman et al.

[11] 3,824,452
[45] July 16, 1974

[54] FOURIER TRANSFORM NUCLEAR MAGNETIC RESONANCE SPECTROMETER EMPLOYING MEANS FOR GENERATING RANDOM PULSE INTERVALS TO AVOID ANOMALIES DUE TO NET TRANSVERSE MAGNETIZATION

[75] Inventors: Raymond Freeman, Menlo Park; Howard D. W. Hill, Cupertino, both of Calif.

[73] Assignee: Varian Associates, Palo Alto, Calif.

[22] Filed: June 6, 1973

[21] Appl. No.: 367,598

Related U.S. Application Data

[63] Continuation of Ser. No. 132,527, April 8, 1971, abandoned.

[52] U.S. Cl. ............................. 324/.5 R, 324/.5 A
[51] Int. Cl. ......................................... G01n 27/00
[58] Field of Search ............ 324/.5 A, .5 AC, .5 AH

[56] References Cited
UNITED STATES PATENTS
3,581,191  5/1971  Anderson ..................... 324/.5 AC
3,588,678  6/1971  Ernst ................................ 324/.5 A Primary Examiner—Robert J. Corcoran
Attorney, Agent, or Firm—Stanley Z. Cole; Gerald M. Fisher

[57] ABSTRACT

Means for eliminating phase and intensity anomalies in high resolution nuclear magnetic resonance spectra particularly useful in impulse Fourier spectrometers wherein free induction decay signals are obtained from a sample under analysis, the demodulated free precession signals being averaged in a time-averaging computer and then Fourier-transformed and displayed as a resonance frequency spectrum. Phase and intensity anomalies are avoidable by not permitting establishment of a finite net transverse component of magnetization in the steady state regime by introducing a delay into each recycle time. Alternatively, net transverse magnetization may be permitted to occur for a set of pulses but the phase and intensity anomalies may be avoided by changing the pulse rate for each set and by time-averaging the responses of the sets of pulses, each set of pulses being a predetermined number of pulses at a fixed pulse interval for each set, the pulse intervals for each set being different from the pulse interval of said first set by a random period.

11 Claims, 10 Drawing Figures

INVENTORS
RAYMOND FREEMAN
HOWARD D. W. HILL

BY *Vincent H. Cleary*
ATTORNEY

IMPULSE MODULATION
T CONSTANT

FIG.3b INSTANT INVENTION
$T_{rn} = T + t_{rn}$

FIG.3c INSTANT INVENTION

TOTAL EXPERIMENT TIME OF ORDER OF 100 SECONDS

FOURIER TRANSFORM NUCLEAR MAGNETIC RESONANCE SPECTROMETER EMPLOYING MEANS FOR GENERATING RANDOM PULSE INTERVALS TO AVOID ANOMALIES DUE TO NET TRANSVERSE MAGNETIZATION

This is a continuation of application Ser. No. 132,527, filed Apr. 8, 1971 now abandoned and assigned.

BACKGROUND OF THE INVENTION

High resolution nuclear magnetic resonance spectrometers wherein the resonance spectra are derived as a Fourier transform of the free induction decay signal obtained from the sample responsive to the application of a strong radio frequency driving pulse to the sample are now in use. These systems offer significant improvement in sensitivity over more conventional systems wherein the resonance spectra are examined by sweeping either the excitation frequency or the applied unidirectional magnetic field through resonance. To improve the signal to noise ratio in these pulsed systems a large number of signals are accumulated coherently and the resultant time-averaged signal is transformed, generally on a digital computer.

Systems of this type are described in an article entitled "Application of Fourier Transform Spectroscopy to Magnetic Resonance" by R. R. Ernst and W. A. Anderson in the Review of Scientific Instruments, Vol. 37, Jan., 1966, pages 93–102 and also in U.S. Pat. No. 3,475,680 issued Oct. 28, 1969 to W. A. Anderson et al. entitled "Impulse Resonance Spectrometer Including a Time Averaging Computer and Fourier Analyzer."

It has been noted that the highest sensitivity is obtained when the r.f. driving pulses are repeated at the highest rate compatible with the required resolution, which is determined by $T_o^{-1}$, where $T_o$ is the period over which the free induction signal is sampled. In pseudo-random Fourier excitation experiments the recycle time ($T$), i.e., period of the pseudo-random sequence, is also determined by the desired resolution. If the spins of a sample retain significant phase memory for a time longer than the recycle time, i.e., if the spin-spin relaxation time ($T_2$) is comparable with the recycle time ($T$), then under the influence of any regularly repeated sequence of pulses which repeats each recycle time, a steady-state response is established where the nuclei have not reached thermal equilibrium when the next pulse in the sequence occurs. Where there are finite net transverse components of magnetization in the sample just before each pulse, the lines of the transformed spectrum exhibit anomalous intensities and a variable degree of dispersion-mode character even if the spectrometer phase is correctly set for absorption.

Where the spin-spin relaxation time of the sample, $T_2$, is so short that the interval between the applied driving radio frequency pulses, $T$, is greater than the relaxation time, the transverse magnetization before pulses is negligable. However, in some samples the relaxation times are long relative to the desired pulse intervals and finite net transverse components of magnetization occur. For example, carbon disulphide has a single narrow $^{13}C$ resonance line, and $T_1 = 44$ seconds and $T_2 = 38$ seconds measured at 15 MHz. Pronounced phase and intensity anomalies are present in the spectrum when operating with normal pulse intervals $T$.

The previously suggested remedy for avoiding this problem is to increase the interval between pulses until it exceeds about three times the longest spin-spin relaxation time in the sample, so that no net transverse magnetization remains before application of the next pulse in the series. This remedy conflicts with the requirements of high sensitivity, particularly in the common practical case where magnet field inhomogeneity causes a much more rapid decay of the free induction signal than spin-spin relaxation.

Another remedy would be to destroy the transverse magnetization by introducing some form of incoherence into the nuclear resonance condition through, for example, an incoherent r.f. source, heteronuclear noise decoupling, an unstable field/frequency lock, or field gradient pulses (made random in amplitude to prevent refocusing). If such devices operate while the free induction signal is being recorded, the decay is accelerated and the transformed spectrum has broadened lines. This undesireable feature could be avoided by applying very strong, random field gradient pulses in the short interval after acquisition of the transient signal but before the next pulse; however this would adversely affect the operation of the internal field/frequency regulation schemes.

SUMMARY OF THE PRESENT INVENTION

In the present invention a novel method and apparatus are employed whereby the net transverse magnetization does not occur, or to permit it to occur but to accumulate the free induction decay signals in such a way as to average the anomalies to zero, a solution which does not lead to any line broadening. This is accomplished by introducing a random delay into the timing of the r.f. pulses.

In one embodiment, a randomly generated delay of a few milliseconds on the timing of every r.f. pulse prevents the establishment of a steady state as far as the transverse components of magnetization $M_x$ and $M_y$ are concerned, eliminating the phase and intensity anomalies associated with steady-state operation.

In an other embodiment, a steady state was allowed to be established by maintaining a stable pulse interval $T_{r1}$ for a predetermined number of pulses (e.g., 64). Then a new pulse interval value for $T_{r2}$ is introduced by adding or subtracting a randomly generated delay which is then held fixed for another series of pulses in order to establish a different steady state with new precession angles for every line in the spectrum. This mode benefits from the improved signal strength obtainable in the steady state regime, and yet "scrambles" the phase and intensity anomalies by averaging the results over many random values of precession angles $\theta$.

These pulse-delay techniques have the advantage of averaging over a range of $\theta$ values without broadening the lines.

DESCRIPTION OF THE DRAWINGS

FIGS. 3a–3c is a representation of the timing of the excitation pulses for the prior art as compared to pulsing embodiments of this invention.

DESCRIPTION OF THE EMBODIMENTS

Figure 1:
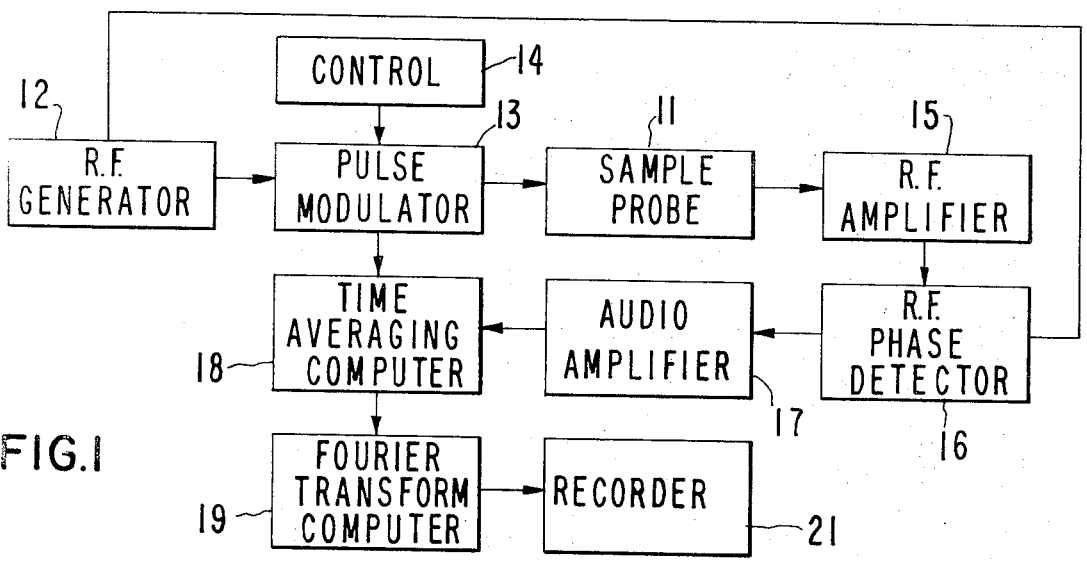
FIG. 1 is a block diagram of a Fourier transform spectrometer system incorporating the present invention.
Figure 3A:
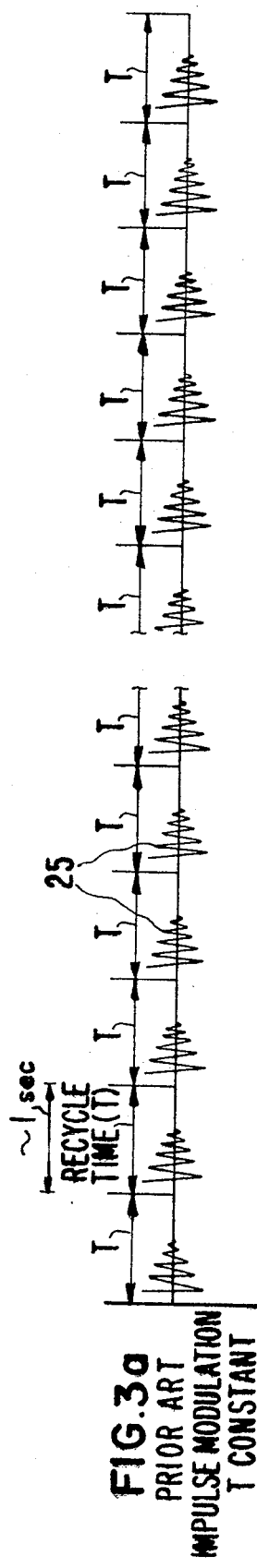
Figure 3A:
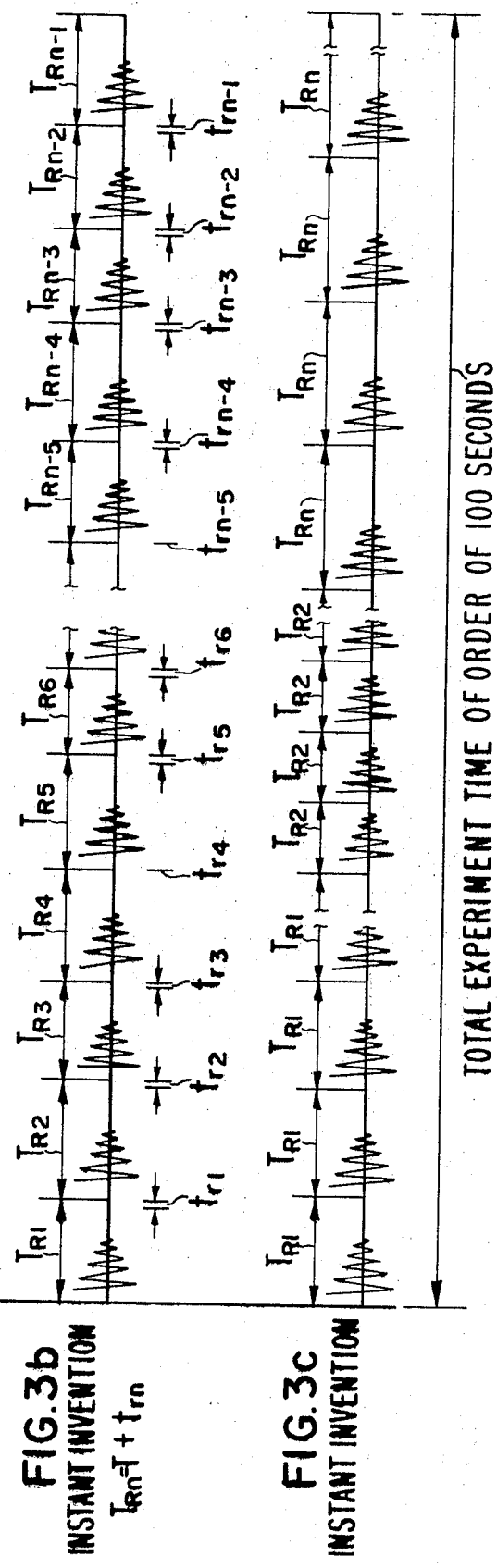

Referring now to FIG. 1, the sample under analysis is held in a sample probe structure 11 within a polarizing magnetic field and is excited to resonance by a driving radio frequency field applied from the radio frequency generator 12, this r.f. signal being pulse modulated by a modulator 13. As an illustration, the excitation signal may be 60 MHz and the modulating pulse FIG. 3a may be 100 microseconds in length and have a repetition rate of one cycle per second. A control circuit 14 is utilized to vary the pulse interval as more fully described below.

The repeating pulses each serve to amplitude modulate the 60 mc. radiation so that the resulting radiation applied to the sample includes sidebands which cover the spectrum portion of interest. The output signal sensed at the probe assembly 10 constitutes the carrier of 60 mc./sec. plus sidebands resulting from each pulse of the RF source, such signals being modulated by the resonances of the sample under investigation. The output signal from the sample is received by an RF amplifier 15, and the amplified signal is then directed to a phase detector 16, which simultaneously receives the unmodulated carrier from the RF oscillator 12. The signals are compared in the phase detector 16 which converts the 60 MHz RF carrier in the correct phase to a D.C. voltage, and converts other sideband signal frequencies to audio frequency signals representing the resonance signal of the sample. These D.C. and low frequency signals are amplified in an audio amplifier 17 and then fed to and stored in a time averaging computer 18.

A transient resonance signal is derived repeatedly after each pulse signal from the modulator 13 and time displaced components of each of the transient resonance signals are stored in memory channels of the computer 18. Each scan of sampling times occupies about a one second interval, and equally spaced successive bits of the derived signal are sensed every millisecond, so that approximately 1,000 signals components are detected and recorded in 1,000 respective channels for every scan. The scan of the time-averaging computer may be internally synchronized from the start of each received transient resonance signal or by a signal derived from the pulse modulator. The scan may be repeated 500 times, by the way of example. For each scan, each storage channel sees a substantially similar data bit as for any other scan, if random noise or other spurious signals do not appear. It is known that with repetitive scanning, signal information may be added directly and noise is added as the square root of the number of scans because of its incoherence. By adding the signal in the time averaging computer, the intelligence signal is reinforced, while noise is minimized, thereby substantially enhancing the signal-to-noise ratio.

The stored data is transformed by Fourier analysis in a computer apparatus 19 from a weighting function or impulse response characteristic, represented as a multiplicity of numbers stored in binary form in a multiplicity of channels of the time averaging computer, to a transfer function or frequency response characteristic of the spin system being investigated. This transformation to transfer function format affords recordation of a spectrum in graphic or visible form on a recorder 21 as is well known in the art.

It has been noted that, when the relaxation time $T_2$ of the sample is longer than or comparable with the pulse interval $T$, a variation in the phase and intensity across the spectrum occurs as a function of the excess precession angle $\theta$. Pulses are thus applied while there is a finite net transverse component of magnetization even in the presense of severe inhomogeneity of the field.

Figures 2A, 2B, 2C:
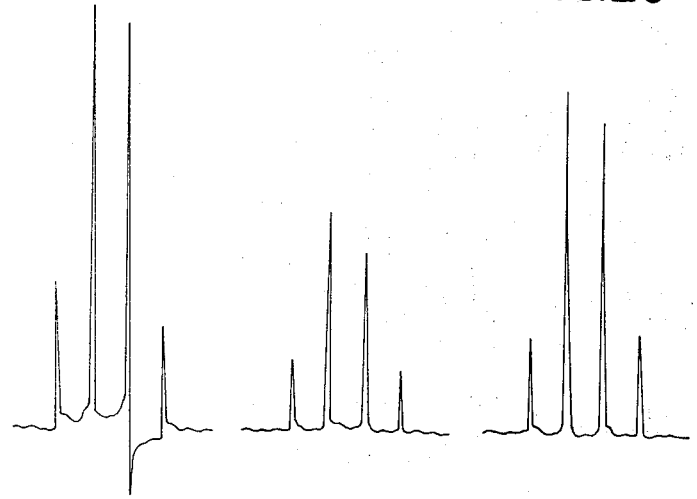
FIGS. 2a–2c' is a set of six spectra of carbon-13 Fourier transform spectra of methyl iodide serving to illustrate the improvement obtained with the present invention.
Figures 2A, 2B, 2C:
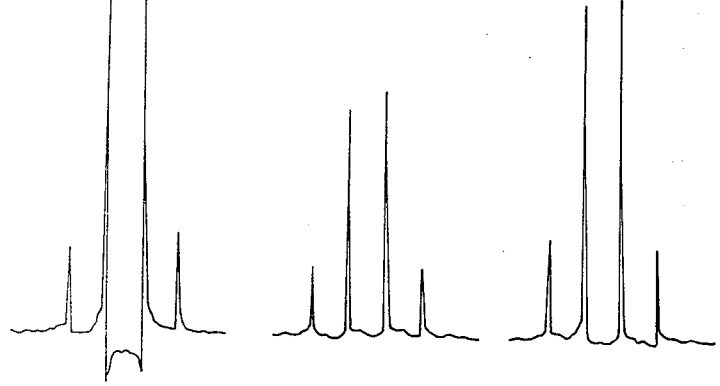

For example, there is shown in FIG. 2 six carbon-13 Fourier transform spectra of methyl iodide observed in a steady-state regime with $T = 0.4$ sec. The three top spectra were recorded at one particular radio frequency setting offset slightly from the center frequency, this frequency off-set being changed slightly for the lower set of three spectra.

Spectra $a$ and $a'$ were obtained with a fixed setting of the pulse interval $T$ and show marked discrepancies in intensity and phase. The intensity anomalies are evident as deviations from the 1:3:3:1 ratio expected for methyl resonance, and the phase anomalies as deviations from the pure absorption mode.

Random delays $t_{rn}$, FIG. 3b, were then introduced into the timing of all the r.f. pulses such that $T_{Rn} = T + t_{rn}$ by the control circuit 14 so that the transverse magnetizations $M_x$ and $M_y$ could not establish steady-state conditions and the spectra $b$ and $b'$ were obtained. The absorption mode character was restored and the approximate 1:3:3:1 intensity ratio of the peaks, but at the cost of a reduction in overall intensity.

Finally, the two spectra $c$ and $c'$ were obtained in the scrambled steady-state mode where the pulse timing was fixed for each of 64 pulses in a set, but was changed for each set. $T_{R1}$ is the pulse interval for the first set depicted in FIG. 3c, TRn being the pulse interval for the $n^{th}$ set, where $n = 1, 2 \ldots$ In the preferred experiment resulting in the FIG. 2c results, 16 sets were employed. The set designator $n$ is defined as the sequential location of a set, i.e., $n$ refers to the $n^{th}$ set of $N$ pulses. Intensity ratio and phase were returned to normal while the overall intensity was improved because the transverse magnetization components $M^-_x$ and $M^-_y$ contribute to the total detected signal once the steady state has been established.

For optimum results, the radio frequency is set up sufficiently offset from the nearest nuclear precession frequency that the product of a typical pulse delay $t_{rn}$ and the smallest offset $\omega_o$ corresponds to a variation of $\theta$ of the order of $2\pi$ radians or more. This is readily achieved with $t_{rn}$ of the order of $10^{-2}$ seconds and the minimum offset $\omega_o/2\pi$ of the order of 100H$_z$.

What is claimed is:

1. A method for producing nuclear magnetic resonance spectrum from a sample under analysis comprising the steps of producing a unidirectional polarizing magnetic field enveloping said sample, applying a plurality of time-spaced pulses of driving radio frequency magnetic field to said sample to produce a series of successive free precession signals from said sample responsive to said driving pulses, demodulating said free precession signals to obtain a series of free induction decay envelope signals, time-averaging discrete segments of said decay signals over the series of successive signals, determining the Fourier transform of said time-averaged signals, and displaying the transformed spectrum, THE IMPROVEMENT COMPRISING, applying the said time-spaced pulses in sets of $N$ pulses in each set, each successive pulse being displaced in time a pulse interval $T_n$ from the next preceding pulse, where $T_n = T + t_{rn}$, where $T$ is a fixed time interval, $t_{rn}$ is a randomly determined deviation not equal to a multiple of $T$ and n represents the set designator and $n$ is a positive integer greater than zero.

2. The method of claim 1 in which $N$ is an integer greater than 1 on the order of 64 and wherein $t_{rn}$ is constant for $N$ intervals of each set of N pulses, whereby net transverse magnetization is established but wherein the said time-averaging of the free precession signals scrambles the phase anomalies associated with steady state displays of transformed spectra.

3. The method of claim 1 in which $N = 1$ whereby net transverse magnetization is effectively prevented from introducing anomalies into the free precession signals.

4. A nuclear magnetic resonance spectrometer for producing nuclear magnetic resonance spectrum from a sample under analysis comprising means for producing a unidirectional polarizing magnetic field enveloping said sample, means for applying a plurality of time-spaced pulses of driving radio frequency magnetic field to said sample to produce a series of successive free precession signals from said sample responsive to said driving pulses, means for demodulating said free precession signals to obtain a series of free induction decay envelope signals, means for time-averaging discrete segments of said decay signals over the series of successive signals, means for determining the Fourier transform of said time-averaged signals, and means for displaying the transferred spectrum, THE IMPROVEMENT COMPRISING, means for applying the said time-spaced pulses including means for generating said pulses in sets of N pulses in each set, each successive pulse being displaced in time a pulse interval $T_{Rn}$ from the next preceding pulse, where $T_{Rn} = T + t_{rn}$, where $T$ is a fixed time interval, $t_{rn}$ is a randomly determined deviation not equal to a multiple of $T$, and $n$ is a positive integer greater than zero representing the set designator.

5. The spectrometer of claim 4 wherein said means for generating said pulses includes means for generating a pulse train having more than one pulse in each set ($N>1$) whereby net transverse magnetization is established.

6. The spectrometer of claim 4 wherein said means for generating said pulses includes means for generating a pulse train having only one pulse in each set ($N = 1$) whereby no net transverse magnetization takes place.

7. A nuclear magnetic resonance spectrometer for producing nuclear magnetic resonance spectrum from a sample under analysis comprising means for producing a unidirectional polarizing magnetic field enveloping said sample, means for applying a plurality of time-spaced pulses of driving radio frequency magnetic field to said sample to produce a series of successive free precession signals from said sample responsive to said driving pulses, said pulses being applied at a particular recycle rate, means for demodulating said free precession signals to obtain a series of free induction decay envelope signals, means for time-averaging discrete segments of said decay signals over the series of successive signals, means for determining the Fourier transform of said time-averaged signals, and means for displaying the transformed spectrum, THE IMPROVEMENT COMPRISING, means for randomizing the recycle time by periodically changing the delay time between the start of applied pulses of driving radio frequency in each recycle time to thereby prevent the establishment of a steady state net transverse component of magnetization in the sample.

8. A nuclear magnetic resonance spectrometer as claimed in claim 7 wherein said means for periodically changing the delay time between the start of applied pulses comprises means for producing random changes between successive pulses.

9. A method for producing nuclear magnetic resonance spectrum from a sample under analysis comprising the steps of producing a unidirectional polarizing magnetic field enveloping said sample, applying a plurality of time-spaced pulses of driving radio frequency magnetic field to said sample to produce a series of successive free precession signals from said sample responsive to said driving pulses, said pulses being applied at a particular recycle rate, demodulating said free precession signals to obtain a series of free induction decay envelope signals, time-averaging discrete segments of said decay signals over the series of successive signals, determining the Fourier transform of said time-averaged signals, and displaying the transformed spectrum, THE IMPROVEMENT COMPRISING, the step of randomizing the recycle time by periodically changing the delay time between the start of applied pulses of driving radio frequency in each recycle time to thereby effectively eliminate the establishment of a steady state net transverse component of magnetization in the sample.

10. A method as claimed in claim 9 wherein the step of periodically changing the delay time between the start of applied pulses comprises producing random changes between successive pulses.

11. A method for correcting for net transverse magnetization effects on a sample spectrum in an impulse-excited free precession resonance spectrometer including the steps of
 a. producing a unidirectional polarizing magnetic field enveloping a sample;
 b. applying a plurality of sets of time-spaced pulses of driving RF magnetic field to produce a series of free precession signals;
 c. detecting said free precession signals;
 d. synchronously storing and time-averaging discrete segments of said free precession signals;
 e. determining the Fourier transform of said time-averaged signals;
 f. displaying said transformed spectrum, and wherein the step of applying a plurality of sets of time-spaced pulses includes
 g. exciting said sample for a time less than the total experiment time with a first set of like pulses, each said pulse of said first set being displaced apart a first interval, the time and number of pulses of said first set being sufficient to result in a net transverse magnetization of phase angle $\theta_1$;
 h. discontinuing excitation of said sample with said first set of pulses;
 i. exciting said sample for a time less than the total experiment time with a second set of like pulses, each said pulse of said second set being displaced apart a second interval, the time and number of pulses of said second set being sufficient to result in a net transverse magnetization of phase angle $\theta_2$, whereby the time average of said free precession signals corrects for anomalies due to said net transverse magnetization.

* * * * *